United States Patent
Yu et al.

(10) Patent No.: US 10,303,930 B2
(45) Date of Patent: May 28, 2019

(54) SYSTEMS AND METHODS FOR USER DETECTION AND RECOGNITION

(71) Applicant: Tinoq Inc., Santa Clara, CA (US)

(72) Inventors: Daxiao Yu, Cupertino, CA (US); Yang Sun, San Jose, CA (US)

(73) Assignee: Tinoq Inc., Santa Clara, CA (US)

( * ) Notice: Subject to any disclaimer, the term of this patent is extended or adjusted under 35 U.S.C. 154(b) by 60 days.

(21) Appl. No.: 15/475,046

(22) Filed: Mar. 30, 2017

(65) Prior Publication Data

US 2017/0286756 A1    Oct. 5, 2017

Related U.S. Application Data

(60) Provisional application No. 62/314,993, filed on Mar. 30, 2016.

(51) Int. Cl.
*G06K 9/00* (2006.01)
*H04N 5/232* (2006.01)
*G06K 9/32* (2006.01)

(52) U.S. Cl.
CPC ..... *G06K 9/00288* (2013.01); *G06K 9/00771* (2013.01); *H04N 5/23206* (2013.01); *H04N 5/23296* (2013.01); *G06K 9/00228* (2013.01); *G06K 9/3233* (2013.01)

(58) Field of Classification Search
CPC ... G06K 9/00771; G06K 9/00335; G06T 7/20
See application file for complete search history.

(56) References Cited

U.S. PATENT DOCUMENTS

| | | | |
|---|---|---|---|
| 6,032,109 A | 2/2000 | Ritmiller, III | |
| 6,043,493 A | 3/2000 | Kim et al. | |
| 7,114,079 B1 | 9/2006 | Cook et al. | |
| 7,889,381 B2 | 2/2011 | Suzuki et al. | |
| 7,904,052 B2 | 3/2011 | Moriwaki | |

(Continued)

FOREIGN PATENT DOCUMENTS

CN    204360454    5/2015

OTHER PUBLICATIONS

International Search Report and Written Opinion dated May 18, 2017 in related International Application No. PCT/US2017/020354 filed Mar. 2, 2017, 8 pages.

(Continued)

*Primary Examiner* — Utpal D Shah
(74) *Attorney, Agent, or Firm* — North Weber & Baugh LLP

(57) ABSTRACT

A system of user detection includes a camera configured to rotate to a plurality of positions, a memory that stores a module, and a processor coupled, locally or remotely, to the camera. The processor is configured to send a command to the camera to cause the camera to (1) rotate to a position from the plurality of positions, and (2) capture a photo or a video clip at the position. The processor is configured to receive the photo or the video clip from the camera; determine whether a user is captured in the photo or the video clip; divide the photo or the video clip into a plurality of zones; determine a zone from the plurality of zones where the user appears in the photo or the video clip; and determine whether the user is associated with a device based on information of the position and the zone.

20 Claims, 4 Drawing Sheets

(56) References Cited

U.S. PATENT DOCUMENTS

| | | | |
|---|---|---|---|
| 8,230,246 B1 | 7/2012 | Sharkey | |
| 8,320,643 B2 | 11/2012 | Nakanowatari et al. | |
| 8,340,366 B2 | 12/2012 | Masuda et al. | |
| 8,457,367 B1 | 6/2013 | Sipe et al. | |
| 8,544,033 B1 | 9/2013 | Acharya et al. | |
| 8,856,541 B1 | 10/2014 | Chaudhury et al. | |
| 8,939,007 B2 | 1/2015 | Uemura | |
| 9,245,172 B2 | 1/2016 | Koseki et al. | |
| 9,336,456 B2* | 5/2016 | DeLean | G06K 9/00335 |
| 9,342,744 B2* | 5/2016 | Asa | G06K 9/00221 |
| 9,691,221 B2* | 6/2017 | Block | G06Q 30/02 |
| 9,830,631 B1 | 11/2017 | Dhua et al. | |
| 9,924,312 B2 | 3/2018 | Kim | |
| 2002/0113862 A1 | 8/2002 | Center, Jr. et al. | |
| 2005/0012818 A1 | 1/2005 | Kiely et al. | |
| 2005/0164651 A1 | 7/2005 | Ollis et al. | |
| 2005/0213796 A1 | 9/2005 | Ikoma et al. | |
| 2006/0018522 A1 | 1/2006 | Sunzeri et al. | |
| 2007/0117623 A1 | 5/2007 | Nelson et al. | |
| 2008/0039136 A1 | 2/2008 | Byun | |
| 2008/0234935 A1 | 9/2008 | Wolf et al. | |
| 2009/0060293 A1 | 3/2009 | Nagao et al. | |
| 2009/0167883 A1 | 7/2009 | Nozaki | |
| 2010/0203829 A1 | 8/2010 | Granqvist et al. | |
| 2011/0103643 A1 | 5/2011 | Salsman et al. | |
| 2011/0268024 A1 | 11/2011 | Jamp et al. | |
| 2012/0230555 A1 | 9/2012 | Miura et al. | |
| 2012/0251079 A1* | 10/2012 | Meschter | G06F 19/3481 386/278 |
| 2013/0002869 A1* | 1/2013 | Yuasa | H04N 5/232 348/143 |
| 2013/0208952 A1 | 8/2013 | Auchinleck | |
| 2014/0044318 A1 | 2/2014 | Derakhshani et al. | |
| 2014/0107846 A1 | 4/2014 | Li | |
| 2014/0274031 A1 | 8/2014 | Menendez | |
| 2014/0330408 A1 | 11/2014 | Rolley | |
| 2015/0065301 A1 | 3/2015 | Oteman | |
| 2015/0293580 A1 | 10/2015 | Munoz et al. | |
| 2015/0335950 A1 | 11/2015 | Eder | |
| 2016/0358443 A1 | 12/2016 | True | |
| 2017/0078454 A1 | 3/2017 | Berookhim et al. | |
| 2017/0347039 A1* | 11/2017 | Baumert | H04N 5/265 |
| 2018/0050234 A1 | 2/2018 | Kashyap | |
| 2018/0232592 A1* | 8/2018 | Stewart | G06K 9/2054 |

OTHER PUBLICATIONS

International Search Report and Written Opinion dated Jun. 5, 2017 in related International Application No. PCT/US2017/021448 filed Mar. 8, 2017, 8 pages.

International Search Report and Written Opinion dated Jun. 15, 2017 in related International Application No. PCT/US2017/025183 filed Mar. 30, 2017, 13 pages.

Advisory Action dated Nov. 5, 2018, in U.S. Appl. No. 15/453,703 (3 pgs).

Applicant-Initiated Interview Summary dated Oct. 18, 2018 in U.S. Appl. No. 15/453,703 (4 pgs).

Non-Final Office Action dated Jan. 11, 2018, in U.S. Appl. No. 15/453,703 (46 pgs).

Response to Non-Final Office Action dated Jul. 11, 2018, in U.S. Appl. No. 15/453,703 (9 pgs).

Non-Final Office Action dated Oct. 15, 2018 in U.S. Appl. No. 15/262,494, filed Sep. 12, 2016 (22 pgs).

Non-Final Office Action Response dated Dec. 6, 2018 in U.S. Appl. No. 15/262,494, filed Sep. 12, 2016 (10 pgs).

Non-Final Office Action dated Jun. 14, 2017, in U.S. Appl. No. 15/331,238, (28 pgs).

Notice of Allowance dated Oct. 20, 2017, in U.S. Appl. No. 15/331,238, (24 pgs).

Final Office Action dated Aug. 28, 2018, in related U.S. Appl. No. 15/453,703 (26 pgs).

Response to Final Office Action filed Oct. 26, 2018, in related U.S. Appl. No. 15/453,703 (13 pgs).

Non-Final Office Action dated Jun. 27, 2018, in related U.S. Appl. No. 15/448,194 (19 pgs).

Response filed Sep. 25, 2018, in related U.S. Appl. No. 15/448,194 (11 pgs).

Non-Final Office Action dated Dec. 20, 2018 in related U.S. Appl. No. 15/453,703, filed Mar. 8, 2017 (41 pgs).

Non-Final Office Action Response dated Mar. 19, 2019 in related U.S. Appl. No. 15/453,703, filed Mar. 8, 2017 (12 pgs).

Notice of Allowance dated Jan. 17, 2019 in related U.S. Appl. No. 15/448,194, filed Mar. 2, 2017 (25 pgs).

Final Office Action dated Feb. 4, 2019 in related U.S. Appl. No. 15/262,494, filed Sep. 12, 2016 (25 pgs).

* cited by examiner

SYSTEMS AND METHODS FOR USER DETECTION AND RECOGNITION

RELATED APPLICATION

This application claims benefit under 35 U.S.C. § 119(e) to U.S. Provisional Patent Application Ser. No. 62/314,993, titled "Face Detection and Recognition for Gym Data Collection," filed on Mar. 30, 2016, which is explicitly incorporated by reference herein in its entirety. This application also relates to U.S. patent application Ser. No. 15/262,494, titled "Smart Fitness and Exercise Equipment," filed on Sep. 12, 2016, which is incorporated herein in its entirety. This application also relates to U.S. patent application Ser. No. 15/331,238, titled "Systems and Methods for Tracking, Collecting, and Analyzing User Data for Gyms," filed on Oct. 21, 2016, which is incorporated herein in its entirety. This application also relates to U.S. patent application Ser. No. 15/448,194, titled "Systems and Methods for Efficient Face Recognition," filed on Mar. 2, 2017, which is incorporated herein in its entirety. This application also relates to U.S. patent application Ser. No. 15/453,703, titled "Systems and Methods for a Compound Sensor System," filed on Mar. 8, 2017, which is incorporated herein in its entirety.

BACKGROUND OF THE INVENTION

Technical Field

This invention relates generally to the field of user detection and/or recognition.

Description of the Related Art

There are tens of millions of paid members today who exercise regularly in gyms, including fitness centers, health clubs, and recreational centers. It is desirable to have an automatic registration mechanism for gym members to start on any exercise device with minimum user intervention. Also, it would be highly valuable for gym members to easily record their exercise activities on the exercise device.

One way to facilitate the process of autonomous data collection in gyms is to mount one or more cameras on an exercise device or in a facility. When a user starts exercise with the equipment, one or more images of the user may be taken by the cameras and forwarded to a face recognition system to automatically recognized the user and record exercise data associated with the identified user. The face detection and recognition system is described in more details in U.S. patent application Ser. No. 15/448,194, filed on Mar. 2, 2017, which is incorporated herein in its entirety.

In some situations, however, it may be desirable to use one camera to cover an area with multiple exercise devices. As one example, it is difficult to mount a camera on some exercise devices, such as weight lifting benches, so that the camera can capture the user's face easily. As another example, it can be more cost effective to use one camera to cover multiple exercise devices than having a dedicated camera for each exercise device.

Therefore, it is desirable to provide methods and systems to have one camera to cover an area with multiple exercises devices and detect and recognize whether a user is using an exercise device in that area.

SUMMARY

In accordance with the disclosed subject matter, systems and methods are provided for detecting and/or recognizing a user.

Disclosed subject matter includes, in one aspect, a system of user detection. The system includes a camera configured to rotate to a plurality of positions, a memory that stores a module, and a processor coupled, locally or remotely, to the camera. The processor is configured to run the module stored in the memory that is configured to cause the processor to send a command to the camera to cause the camera to (1) rotate to a position from the plurality of positions, and (2) capture a photo or a video clip at the position. The processor is configured to receive the photo or the video clip from the camera. The processor is configured to determine whether a user is captured in the photo or the video clip. The processor is configured to divide the photo or the video clip into a plurality of zones. The processor is configured to determine a zone from the plurality of zones where the user appears in the photo or the video clip. The processor is configured to determine whether the user is associated with a device based on information of the position and the zone.

Disclosed subject matter includes, in another aspect, a system of user detection. The system includes a camera configured to rotate to a plurality of positions, a memory that stores a module, and a processor coupled, locally or remotely, to the camera. The processor is configured to run the module stored in the memory that is configured to cause the processor to send a command to the camera to cause the camera to (1) rotate to a position from the plurality of positions, and (2) capture a photo or a video clip at the position. The processor is configured to receive the photo or the video clip from the camera. The processor is configured to divide the photo or the video clip into a plurality of zones. The processor is configured to determine whether a user is captured in a zone from the plurality of zones. The processor is configured to determine whether the user is associated with a device based on information of the position and the zone.

Disclosed subject matter includes, yet in another aspect, a method for user detection. The method includes sending, at a server to a camera, a command to cause the camera to (1) rotate to a position from the plurality of positions, and (2) capture a photo or a video clip at the position. The method includes receiving, at the server from the camera, the photo or the video clip. The method includes determining, at the server, whether a user is captured in the photo or the video clip. The method includes dividing, at the server, the photo or the video clip into a plurality of zones. The method includes determining, at the server, a zone from the plurality of zones where the user appears in the photo or the video clip. The method includes determining, at the server, whether the user is associated with a device based on information of the position and the zone.

Disclosed subject matter includes, yet in another aspect, a method for user detection. The method includes sending, at a server to a camera, a command to cause the camera to (1) rotate to a position from the plurality of positions, and (2) capture a photo or a video clip at the position. The method includes receiving, at the server from the camera, the photo or the video clip. The method includes dividing, at the server, the photo or the video clip into a plurality of zones. The method includes determining, at the server, whether a user is captured in a zone from the plurality of zones. The method includes determining, at the server, whether the user is associated with a device based on information of the position and the zone.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto.

In this respect, before explaining at least one embodiment of the disclosed subject matter in detail, it is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

These together with the other objects of the disclosed subject matter, along with the various features of novelty which characterize the disclosed subject matter, are pointed out with particularity in the claims annexed to and forming a part of this disclosure. For a better understanding of the disclosed subject matter, its operating advantages and the specific objects attained by its uses, reference should be made to the accompanying drawings and descriptive matter in which there are illustrated preferred embodiments of the disclosed subject matter.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

With the rapid progress in image sensor and microprocessor technologies, cameras and face recognition systems can be designed more efficiently for collecting gym data. One embodiment of the present disclosure provides such a gym data collection system using one high-resolution camera module to cover an area with multiple pieces of equipment. Multiple such cameras can be deployed to cover all the equipment in the gym.

Figure 1:
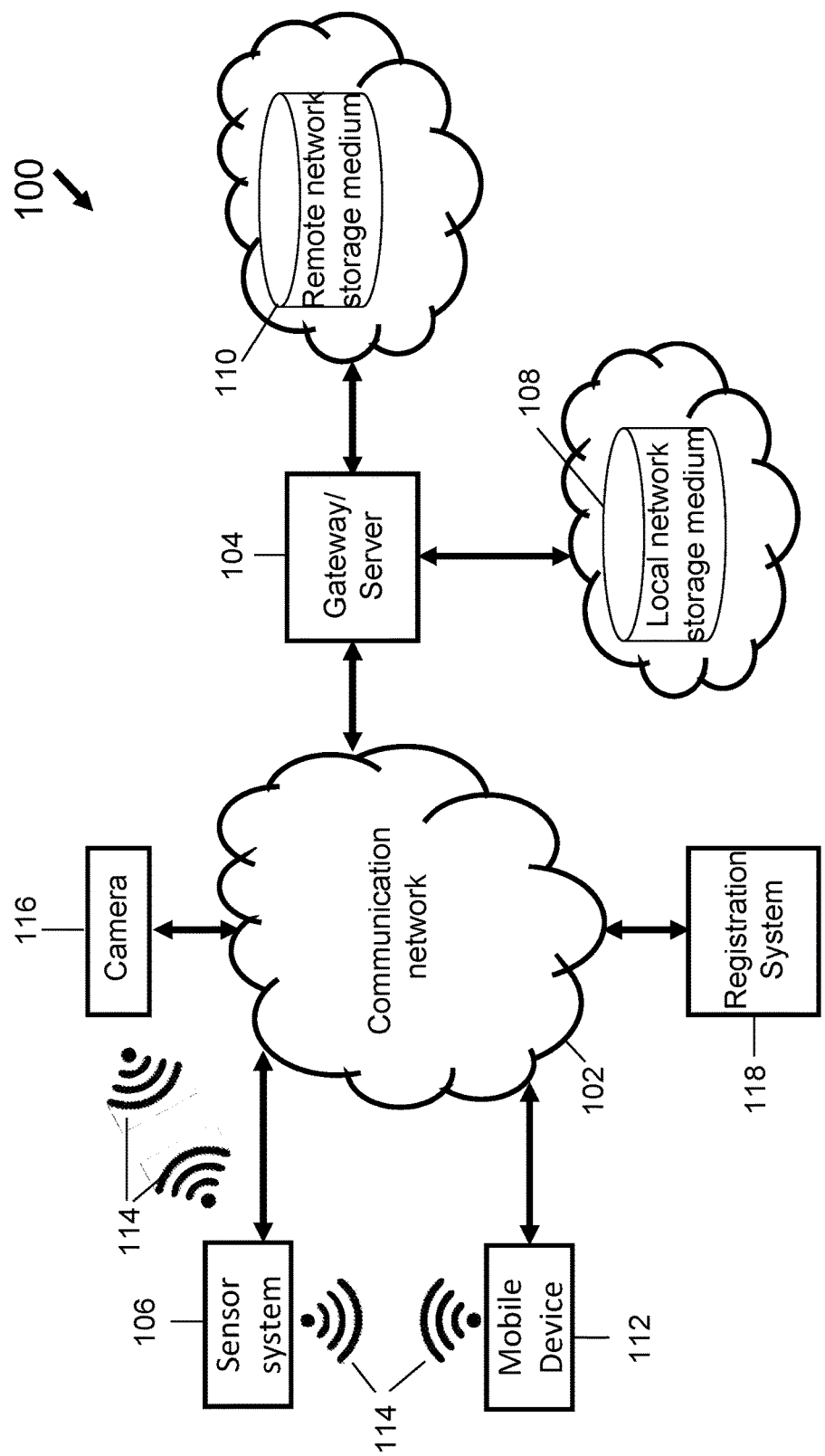
FIG. 1 illustrates an environment for detecting a user's presence and recording the user's activity in a gym according to certain embodiments of the disclosed subject matter.

FIG. 1 illustrates an environment 100 for detecting a user's presence and recording the user's activity in a gym according to certain embodiments of the disclosed subject matter. The environment 100 can include a communication network 102, a server 104, a sensor system 106, a local network storage medium 108, a remote network storage medium 110, a mobile device 112, a wireless network 114, a camera 116, and a registration system 118. Some or all components of the environment 100 can be coupled directly or indirectly to the communication network 102. The components included in the environment 100 can be further broken down into more than one component and/or combined together in any suitable arrangement. Further, one or more components can be rearranged, changed, added, and/or removed. For example, the environment 100 can include more than one sensor system 106, more than one camera 116, and/or more than one mobile device 112. In some embodiments, the environment 100 can also include a tracking device.

The sensor system 106 can be attached to an exercise device. Non-limiting examples of exercise devices include treadmills, ellipticals, exercise bikes, rowing machines, stair climbers, weightlifting benches, weight machines, etc. In some embodiments, the sensor system 106 can be attached to an exercise device non-intrusively. In some embodiments, the sensor system 106 can be taken off from one exercise device and attached to another exercise device. The sensor system 106 can be configured to communicate wirelessly with at least one camera 116, mobile device 112, the server 104, and/or other suitable components of the environment 100. In some embodiments, the sensor system 106 can detect when a user or his or her mobile device 112 enters or leaves a target area of the sensor system 106 and notify other components of the environment 100, such as the camera 116, server/gateway 104, mobile device 112, via the wireless network 114 and/or the communication network 102. For example, when the sensor system 106 is attached to a treadmill, then the target area can be above the base of the treadmill. As another example, when the sensor system 106 is attached to a workbench, then the target area can be the area where an exerciser sits or lie on. In some embodiments, the sensor system 106 can sense or detect movements of an exercise device and/or the user using the exercise device. In some embodiments, once the sensor system 106 detects a user is using an exercise device, it can report the detection result to and/or trigger other components of the environment 100 such as the camera 116 and/or the server/gateway 104. In some embodiments, the sensor system 106 can include one or more proximity sensors, such as a passive infra-red (PIR) sensor, an ambient light sensor, a photoelectric sensor, an ultrasonic sensor, a time of flight distance sensor, a thermopile sensor, an accelerometer, a speedometer, a pressure sensor or any other suitable sensors or combination of sensors.

The mobile device 112 can be connected to the sensor system 106 via the wireless network 114. In some embodiments, the mobile device 112 can also be configured to communicate wirelessly with the server 104 and/or other suitable components of the environment 100 via the wireless network 114 and/or the communication network 102. The mobile device can be a tablet computer, a personal digital assistant (PDA), a pager, a mobile or smart phone, a wireless sensor, a wearable device, or any other suitable device.

The communication network 102 can include a network or combination of networks that can accommodate private data communication. For example, the communication network 102 can include a local area network (LAN), a virtual private network (VPN) coupled to the LAN, a private cellular network, a private telephone network, a private computer network, a private packet switching network, a private line switching network, a private wide area network (WAN), a corporate network, or any number of private networks that can be referred to as an Intranet. Such networks may be implemented with any number of hardware and software components, transmission media and network protocols. FIG. 1 shows the communication network 102 as a single network; however, the communication network 102 can include multiple interconnected networks listed above.

The server 104 can be a single server, a network of servers, or a farm of servers in a data center. The server 104 can be coupled to a network storage system. The network storage system can include two types of network storage devices: a local network storage medium 108 and a remote network storage medium 110. The local network storage medium 108 and the remote network storage medium 110 can each include at least one physical, non-transitory storage medium, flash memory, a magnetic disk drive, an optical drive, a programmable read-only memory (PROM), a read-only memory (ROM), or any other memory or combination of memories. The local network storage medium 108 and the remote network storage medium 110 can be part of the server 104 or can be separated from the server 104.

In some embodiments, the server 104 can be located within or near a gym or a fitness center. In some embodiments, the server 104 can be located at a remote location. In some embodiments, the server 104 can have two components, one component that is local to the gym and another component that is located remotely. In some embodiments the server 104 can also include a gateway and/or an access point to direct any signals received from the sensor system 106, the mobile device 112, and/or other components of the environment 100.

In some embodiments, the server 104 manages a database of the registered gym members including registered faces gathered from the registration system 118. In some embodiments, the server 104 also stores the face images captured from the camera 116 and performs face recognition.

In some embodiments, the server 104 manages and stores user exercise data, which is collected by the exercise device with embedded sensors or by sensors attached to the exercise device. In some embodiments, the server 104 stores the exercise data in association with respective users, which can be identified by the user detection and/or face recognition process.

In some embodiments, if during the user detection and/or face recognition process, the server 104 determines that the image quality of the face image is not good enough for recognition, it sends commands back to the camera 116 to retake one or more photos and/or video clips.

In some embodiments, the server 104 may offload some of its computing and/or storage tasks to one or more gateways, as described below.

In some embodiments, the environment 100 may also include one or more gateways that are separate from the server 104. Multiple gateways can be deployed in one gym. In one embodiment, one or more gateways can be used as a communication hub to connect the camera 116 and/or other components of the environment 100 to the server 104.

In some embodiments, besides serving as the communication hub between the camera 116 and/or other components of the environment 100 on one end and the server 104 on the other end, a gateway can also help share the load of computing and reduce data storage required from the server 104. The advantages include, among others, faster response time and lower cloud computing cost.

In some embodiments, a gateway detects faces from one or more photos and/or video clips taken by the camera 116, extracts the face features from the photos and/or video clips, and transmits the extracted features together with the photos to the server 104 for face recognition and image storage.

In some embodiments, the gateway detects faces from the one or more photos and/or video clips taken by the camera 116, extracts the face features from the photos and/or video clips, and performs face recognition locally. In this case, the server 104 only stores the photos received from the gateway. If the gateway determines that the image quality is not good enough for face recognition, it sends commands to the camera 116 to retake one or more photos and/or video clips and restarts the face recognition process.

Furthermore, user detection and/or face recognition tasks can be partitioned and shared between the gateway and the server 104, and the partitioning and sharing can be arranged or rearranged dynamically to meet the face recognition system requirements.

In some embodiments, the camera 116 can be high-resolution camera that one or more image sensors (e.g., dual image sensors), such as a 3D camera or a light-field camera. The camera 116 can take still photos as well as video clips. In some embodiments, the camera 116 can be mounted at a location where multiple exercise devices can be covered by the field of view of the camera 116, and the camera 116 can point at the faces of any gym members who are exercising with those devices. In some embodiments, more than one camera 116 can be deployed to cover all the exercise devices in the gym. In some embodiments, the camera 116 can be attached to an exercise device. In some embodiments, the camera 116 can be attached to an exercise device non-intrusively. In some embodiments, the camera 116 can be taken off from one exercise device and attached to another exercise device. In some embodiments, the camera 116 can be configured to communicate wirelessly with at least one sensor system 106, at least one mobile device 112, the server/gateway 104, and/or other suitable components of the environment 100. In some embodiments, the camera 116 can periodically rotate to different positions and take photos and/or video clips at each position. The structure and function of the camera 116 are described in more detail below.

The registration system 118 typically locates near or at the entrance of a facility. for example, the registration system 118 can locate near or at the entrance of a gym. In some embodiments, when a user enters or leaves a gym, he or she will be registered by the registration system 118. In some embodiments, the registration system 118 also includes a camera, which can be configured to acquire one or more photos and/or video clips of a user who sign in at the gym. In some embodiments, each user may register his or her face multiple times, which in general improve the performance of face recognition algorithms. When a registered user walks in the gym and/or starts on an exercise device, face images of the user captured by the camera 116 associated with the exercise device will be compared against registered faces to identify the correct user.

In some embodiments, during the face registration, registered faces need to be validated by the registration system 118 and/or other suitable components of the environment 100. Validation criteria can include one or more of the following: (1) whether the user has a valid membership, and (2) whether the face images captured at the registration system 118 contain sufficient information for recognition purpose.

Each time a user registers at the registration system 118, his or her face information, such as photos or video clips, can be acquired by one of the following embodiments or any combinations of the following embodiments. In one embodiment, the user's face information can be acquired by the camera associated with the registration system 118. In one embodiment, the user's face information can be retrieved from the gym's member management system, where previously taken photos of gym members can be stored. In one embodiment, the user's face images can be acquired from mobile applications running on the user's mobile device 112 and/or other suitable devices associated with the user.

In some embodiments, the sensor system 106, the camera 116, the mobile device 112, and/or other components of the environment 100 can communicate with each other through the wireless connection 114. The wireless connection can be WiFi, ZigBee, IEEE802.15.4, Bluetooth, near field communication (NFC), or another connection using any other suitable wireless protocol standard or combination of standards. In some embodiments, the wireless connection 114 can be the same as the communication network 102. In some embodiments, the wireless connection 114 can be different from the communication network 102.

Figure 2:
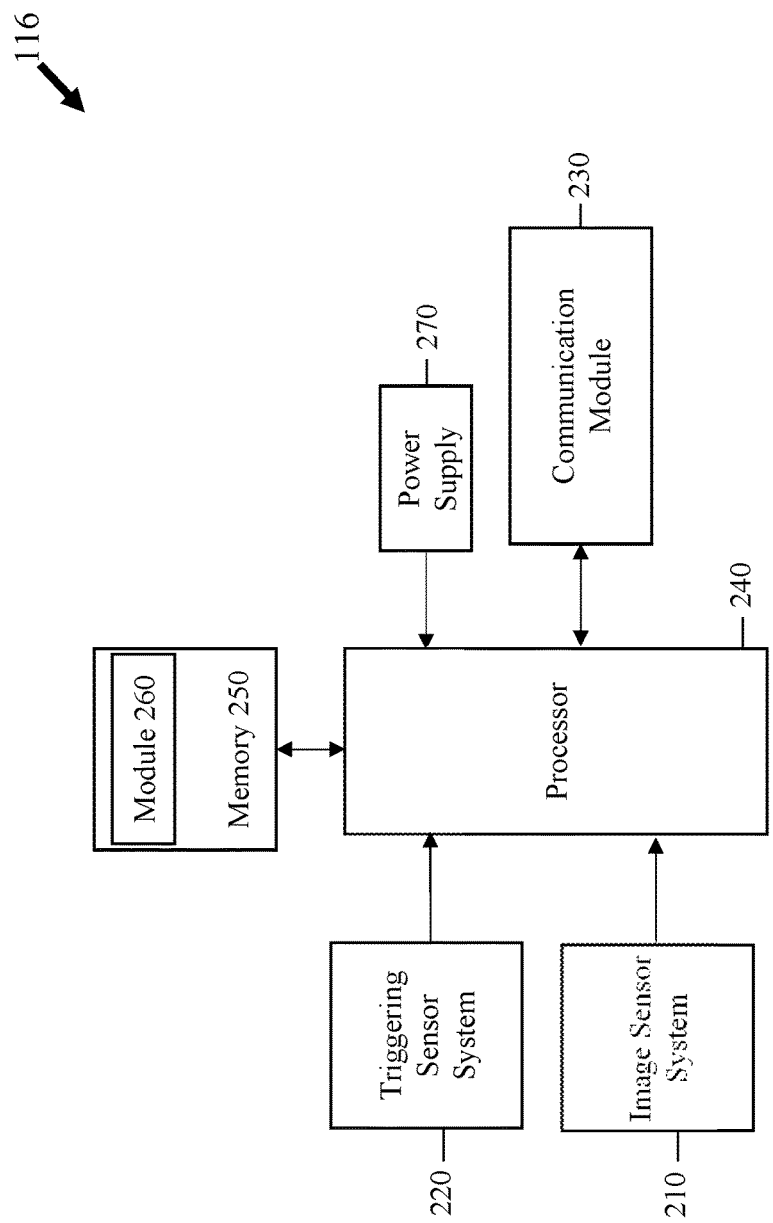
FIG. 2 illustrates a block diagram of a camera according to certain embodiments of the present disclosure.

FIG. 2 illustrates a block diagram of a camera 116 according to certain embodiments of the present disclosure. The camera 116 includes an image sensor system 210, a triggering sensor system 220, a wireless transceiver 230, a processor 240, a memory 250, a module 260, and a power supply 270. The components included in the camera 116 can be further broken down into more than one component and/or combined together in any suitable arrangement. Further, one or more components can be rearranged, changed, added, and/or removed.

The image sensor system 210 is configured to take one or more photos and/or video clips of a user. The image sensor system 210 can include one or more image sensors. In some embodiments, the image sensor can be dual image sensors, 2-dimensional complementary metal-oxide semiconductor (CMOS) image sensor, 3-dimensional CMOS image sensor, infrared image sensor, charge-coupled device (CCD) image sensors, or interferometric reflectance imaging sensor. In some embodiments, one or more sensors of the image sensor system 210 can rotate among multiple positions periodically and capture photos and/or video clips at those positions. In some embodiments, the camera 116 as a whole can rotate among multiple positions periodically, and the image sensor systems 210 can capture photos and/or video clips at those positions.

In some embodiments, the triggering sensor system 210 includes at least one proximity sensor, such as a passive infra-red (PIR) sensor, an ambient light sensor, a photoelectric sensor, an ultrasonic sensor, a time of flight distance sensor, a thermopile sensor, or any other suitable sensors or combination of sensors.

The triggering sensor system 220 is configured to trigger the image sensor system 210 to take one or more photos and/or video clips of users. In some embodiments, the triggering sensor system 220 can include one or more sensors, such as proximity sensors, a switch that users can turn the camera 116 on or off, and a timer that can be configured to trigger the camera 116 instantly or periodically. In one embodiment, one or more proximity sensors are used to trigger the camera 116. Once a proximity sensor detects that an exercise device is occupied, it triggers the one or more image sensors to take one or more photos and/or video clips. Alternatively, a physical switch (e.g., a touch button) is used to trigger the one or more image sensors to take photos and/or video clips. In yet another embodiment, a command sent to the camera 116 from the gateway or the server 104 via the network connections can also trigger the one or more image sensor to take photos and/or video clips. In yet another embodiment, a command sent to the camera 116 from the sensor system 106 can also trigger the one or more image sensors to take photos and/or video clips.

The communication module 230 can be configured to transmit photos and/or video clips to the gateway, the server 104, and/or any other components of the environment 100 through wired or wireless connections. In some embodiments, the communication module 230 can also be configured to receive signals from one or more components of the environment 100. In some embodiments, the communication model 230 can enable the communication with other components of the environment 100 via the wireless network 114.

The processor 240 can include one or more cores and can accommodate one or more threads to run various applications and modules. The software can run on the processor 240 capable of executing computer instructions or computer code. The processor 240 might also be implemented in hardware using an application specific integrated circuit (ASIC), programmable logic array (PLA), field programmable gate array (FPGA), or any other integrated circuit.

The memory 250 can be a non-transitory computer readable medium, flash memory, a magnetic disk drive, an optical drive, a PROM, a ROM, or any other memory or combination of memories.

The processor 240 can be configured to run the module 260 stored in the memory 250 that is configured to cause the processor 240 to perform various steps that are discussed in the disclosed subject matter. In some embodiments, the processor 240 can have one or more post-processing functionalities, such as the image and/or video compression, face detection, face cropping, and/or face feature extraction. In some embodiments, the communication module 230 can transmit the post processing results to the server 104 and/or other components of the environment 100 for other tasks, such as face recognition. In some embodiments, the processor 240 can function as a JPEG encoder. After a photo of the user is taken, the processor 240 compresses the raw image, and the compressed image is transmitted to the server 104 an/or other suitable components of the environment 100 for post-processing and face recognition The power supply 270 provides power to one or more other components of the camera 116. In some embodiments, the power supply 270 can be a battery source. In some embodiments, the power supply 270 can provide alternating current (AC) and/or direct current (DC) power via an external power source.

In some embodiments, the triggering sensor system 220 can also serve as a power control unit for the image sensor system 210. For example, only when the triggering sensor system 220 recognizes that the exercise device is in use by a user, can the image sensor system 210 take photos and/or video clips of the user.

Figure 3:
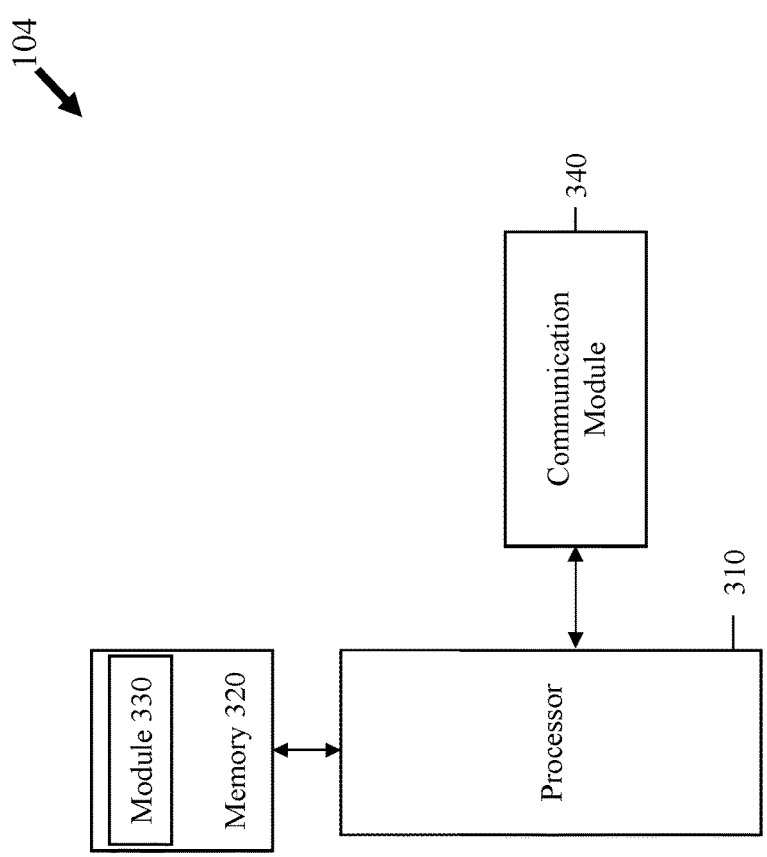
FIG. 3 illustrates a block diagram of a server/gateway according to certain embodiments of the present disclosure.

FIG. 3 illustrates a block diagram of a server/gateway 104 according to certain embodiments of the present disclosure. The server/gateway 104 includes a processor 310, a memory 320, a module 330, and a communication module 340. The components included in the server/gateway 104 can be further broken down into more than one component and/or combined together in any suitable arrangement. Further, one or more components can be rearranged, changed, added, and/or removed.

The processor 310 can include one or more cores and can accommodate one or more threads to run various applications and modules. The software can run on the processor 310 capable of executing computer instructions or computer code. The processor 310 might also be implemented in hardware using an ASIC, PLA, FPGA, or any other integrated circuit.

The memory 320 can be a non-transitory computer readable medium, flash memory, a magnetic disk drive, an optical drive, a PROM, a ROM, or any other memory or combination of memories.

The processor 310 can be configured to run the module 330 stored in the memory 320 that is configured to cause the processor 310 to perform various steps that are discussed in the disclosed subject matter. In some embodiments, the processor 310 can send a command to the camera 116 to cause the camera 116 to (1) rotate to a position from the plurality of positions, and (2) capture a photo or a video clip at the position. In some embodiments, the processor 310 can send the command periodically. In some embodiments, the processor 310 can send the command signal based on receiving a notification signal from the sensor system 106. In some embodiments, the processor 310 can receive the photo or the video clip captured by the camera 116. The processor 310 can determine whether a user is captured in the photo or the video clip. The processor 310 can divide the photo or the video clip into a plurality of zones. The processor 310 can determine a zone from the plurality of zones where the user appears in the photo or the video clip. The processor 310 can determine whether the user is associated with an exercise device based on information of the position and the zone.

In some embodiments, the processor 310 can first divide the photo or the video clip into a plurality of zones, and then determine whether a user is captured in a zone from the plurality of zones where the user appears in the photo or the video clip.

In some embodiments, the processor 310 can have one or more post-processing functionalities, such as the image and/or video compression, face detection, face cropping, face recognition and/or face feature extraction. In some embodiments, the processor 310 can function as a JPEG encoder.

In some embodiments, the processor 310 can recognize a landmark and determine whether the user is associated with an exercise device partly based on the landmark. In some embodiments, the landmark can be a manual make on an exercise device, a flag, QR code, barcode, and/or any other suitable subject that are mounted on an exercise device. In some embodiments, the landmark can be a person posing at a certain position.

The communication module 340 can be configured to receive photos and/or video clips from the camera 116 and transmit command signals to the camera 116. In some embodiments, the communication model 340 can enable the communication with other components of the environment 100 via the wireless network 114.

In some embodiments, when one or more cameras 116 are deployed in a facility such as a gym, the locations of each camera 116 are known and fixed and stored in the server/gateway 104 and/or other suitable components of the environment 100. In some embodiments, the camera 116 is mounted in a way that it can rotate among multiple positions, and, at each position, the camera 116 can cover one or more exercise devices and capture photos and/or video clips that include faces of users using the one or more exercise devices. Each captured photo and/or video clip can be divided into multiple zones, and when a face is detected in a certain zone, the exercise devices associated with the face of the user can be determined based on the zone information and the camera's position.

In some embodiments, as discussed above, a landmark can be identified from the captured photos and/or video clips, and it can be determined whether the user is associated with an exercise device partly based on the landmark. In some embodiments, the landmark can be a manual mark on or near the device, a flag, QR code, barcode, and/or any other suitable subject that are mounted on an exercise device. In some embodiments, the landmark can be a person posing at a certain position.

In some embodiments, the camera 116 works as an occupancy detector and can replace extra occupancy/proximity sensors usually required on the exercise device. In addition, as noted above, the detected face can be further processed by the face recognition system to identify the member, so that exercise data can be collected and associated with the identified member.

In some embodiments, when sensors 106 from multiple exercise devices report new use of the device within a short period of time, the server/gateway 104 may decide to take photos/video clips once during that time period instead of triggering the cameras 116 every time one of the exercise devices starts. In some embodiments, the server/gateway 104 records arrival timestamps for notification signals received from each sensor 106 and notifies the camera 116 when it is due time to capture photos and/or video clips.

In some embodiments, each camera 116 that covers an area with multiple exercise devices can also record live videos. When a user's face is recognized in a frame of a video clip, the face can be tracked throughout the video. Corresponding time and duration of the usage of the exercise device can also be tracked this way.

In some embodiments, the disclosed user detection and recognition system can be further extended to record exercise data. A camera 116 covers the display panel of the exercise device can take photos of the data displayed. For example, the display panel of a treadmill presents exercise information, such as user's speed, distance, inclination, calorie, and/or heart rate. Image recognition applied to the photos of the display panel can distinguish these numbers and record them for the user. As another example, the location of the pin in pin-loaded weight equipment can be identified through image recognition techniques, thus the weight of the loaded plates that the user is exercising can be derived and recorded.

Figure 4:
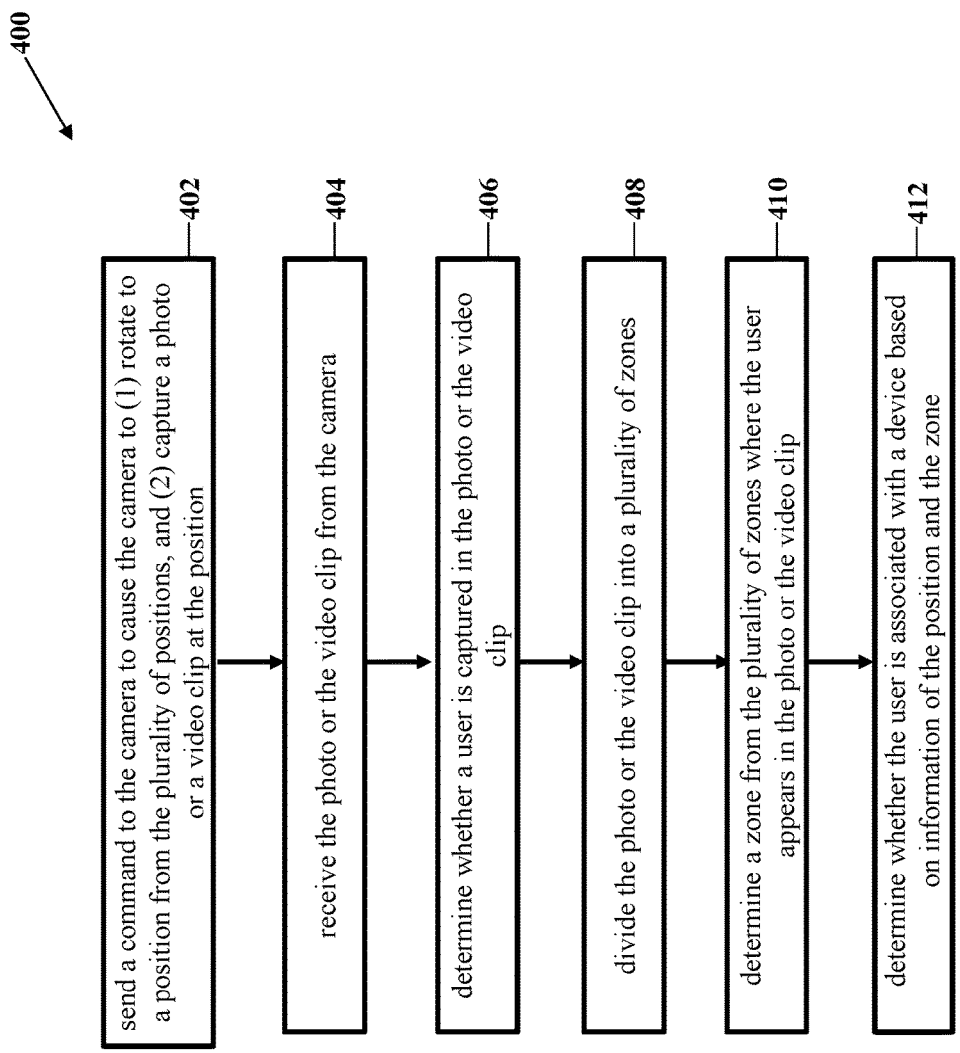
FIG. 4 is a flow chart illustrating a process of user detection according to certain embodiments of the present disclosure.

FIG. 4 is a flow chart illustrating a process 400 of user detection according to certain embodiments of the present disclosure. The process 400 is mainly illustrated from the perspective of the components of the server/gateway 104 that is located either locally within the gym or remotely. In some embodiments, the process 400 can be modified by, for example, having steps rearranged, changed, added, and/or removed.

At step 402, the server/gateway 104 sends a command to the camera 116 to cause the camera 116 to (1) rotate to a position from the plurality of positions, and (2) capture a photo or a video clip at the position. For example, the camera 116 can be configured to rotate among five positions, and, at each position, the camera 116 can cover six exercise devices. By rotating among five positions, the camera 116 can cover 30 exercises devices. In some embodiments, the camera 116 can be configured to rotate among any other suitable number of positions and, at each position, can cover any suitable number of devices. In some embodiments, the camera 116 can be rotated among multiple positions periodically. In some embodiments, the camera 116 rotates to a given position based on receiving a notification signal from one of the sensor systems 106. In some embodiments, the notification signal is in response to the detection a likelihood of having the user enter or leave a target area of an exercise device the sensor system 106 is attached to. In some embodiments, the notification signal is in response to the detection of a likelihood of having the user perform certain motions within a target area of an exercise device the sensor system 106 is attached to. The process 400 then proceeds to step 404.

At step 404, the server/gateway 104 receives the photo or the video clip from the camera 116. The process 400 then proceeds to step 406.

At step 406, the server/gateway 104 determines whether a user is captured in the photo or the video clip. The process 400 then proceeds to step 408.

At step 408, the server/gateway 104 divides the photo or the video clip into a plurality of zones. In some embodiments, the photo or the video clip can be divided horizontally, vertically, and/or any other suitable ways. For example, the photo or the video clips can be divided into a 3×3 tiles or any other suitable divisions. The process 400 then proceeds to step 410.

At step 410, the server/gateway 104 determines a zone from the plurality of zones where the user appears in the photo or the video clip. The process 400 then proceeds to step 412.

At step 412, the server/gateway 104 determines whether the user is associated with a device based on information of the position and the zone.

In some embodiments, the process 400 can skip step 406. Instead, at step 410, the server/gateway 104 determines whether any user exists in at least one of the plurality of zones.

In some embodiments, the notification signal can include information such as the time tag and the location information of the exercise device from with the notification signal is sent. Based on the time and location information, the server/gateway 104 can direct the camera 116 to the position that covers the exercise device, and the server/gateway 104 can also derive which zone it should focus on for detection and/or recognition.

In some embodiments, the process 400 can include additional steps. For example, the server/gateway 104 can recognize a face of the user detected in previous steps. In some embodiments, the candidate sets of the face recognition can be efficiently reduced as described in U.S. patent application Ser. No. 15/448,194, which is incorporated herein in its entirety.

In some embodiments, the server/gateway 104 can recognize a landmark and determine whether the user is associated with an exercise device partly based on the landmark. In some embodiments, the landmark can be a flag, QR code, barcode, and/or any other suitable subject that are mounted on an exercise device. In some embodiments, the landmark can be a person posing at a certain position.

In some embodiments, the camera 116 can be installed in an exercise room, classroom, or other suitable facilities and detect and/or recognize users appear in such facilities. In some embodiments, when a user's face is recognized in a photo or a video clip, the face can be tracked throughout the subsequent photos or video clips. Corresponding time and duration of the usage of the exercise device can also be tracked this way.

In some embodiments, once the sensor system 106 determines that a user enters or leaves an exercise device, it can send that information to other components of the environment 100. In some embodiments, one or more components of the environment 100 can use that information to start or finish recording the user's exercise data and/or the exercise device's operation data. In some embodiments, one or more components of the environment 100 can use that information to start or finish its operation. In some embodiments, one or more components of the environment 100 can use that information to toggle between different power modes, such as between an active mode and a low power mode.

In some embodiments, if the sensor system 106 is battery-operated, the sensor system 106 can send battery information, such as a brownout event, to the gateway of the server 104, so that gym operators can be timely informed to replace the battery of the sensor system.

In some embodiments, regardless the exercise device is used or not, the sensor system 106 can periodically report its run-time status and statistics to the gateway, for bookkeeping and diagnosis purpose of the sensor system 106 and/or the exercise device.

In some embodiments, the sensor system 106 can receive commands from the gateway, such as flashing an LED included in the sensor system 106 to identify itself, so that a gym operator can easily identify the sensor system 106.

In some embodiments, the server 104 may provide a front-end user interface (UI), such as a website, a dedicated PC, or a mobile application, for gym operators and/or trainers to access the users exercise activities, so that proper guidance, advice, and/or training can be provided to the users. In some embodiments, a user interface on mobile and/or web interface can also be provided to the users on mobile devices, for the purpose to monitor and track their exercise activities, as described above.

In some embodiments, a user's detailed exercise information is collected and stored in the server 104. The information includes, but not limited to, start/end time and date, equipment type, duration, sets and repeats (for pin-loaded equipment, workbenches, and power racks), break intervals in all sessions recorded by the mobile device 112 and/or the sensor system 106 associated with exercise device. The data can be organized and displayed in many ways through the front-end user interface (UI).

In some embodiments, the aggregated data of all members collected through mobile devices 112 can be combined to track the equipment usage, improve operation efficiency of gyms, and provide more insights to optimize members' exercise routines.

In some embodiments, the same type of equipment can be grouped together. For a certain group, its total number of visiting members, total number of visits, and total operation time can be compared against those of other groups. If one group has significantly more users than another group, the gym can look into the scenarios and decide which group or groups need to add or reduce number of equipment.

In some embodiments, individual equipment can be compared against others of the same type, particularly when they are physically close. If one specific exercise device always has less member accesses than others or no member accesses, the gym operators may be informed to check the device. This may indicate that the exercise device has certain issues, such as a defect, being close to an environment that is not user-friendly, or something else that needs the gym operators' attention.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A system of user detection, comprising:
   a camera configured to rotate to a plurality of positions;
   a memory that stores a module; and
   a processor coupled, locally or remotely, to the camera, configured to run the module stored in the memory that is configured to cause the processor to:
   send a command to the camera to cause the camera to (1) rotate to a position from the plurality of positions, and (2) capture a photo or a video clip at the position,
   receive the photo or the video clip from the camera,
   determine whether a user is captured in the photo or the video clip,
   send another command to the camera to cause the camera to retake one or more photos or video clips if the user is not captured in the photo or the video clip,
   divide the photo or the video clip into a plurality of zones,
   determine a zone from the plurality of zones where the user appears in the photo or the video clip, and
   determine whether the user is associated with a device based on information of the position and the zone.

2. The system of claim 1, wherein the module is further configured to cause the processor to recognize a face of the user.

3. The system of claim 1, wherein the module is further configured to cause the processor to recognize a landmark in the photo or the video clip, and wherein determining whether the user is associated with the device is further based on the landmark.

4. The system of claim 1, wherein the module is further configured to cause the processor to send the command periodically.

5. The system of claim 1, further comprising a sensor that is attached to the device, wherein the sensor is configured to detect a likelihood of having the user enter or leave a target area, and, in response, send a notification signal to the processor, wherein the module is further configured to cause the processor to send the command based on receiving the notification signal.

6. The system of claim 1, further comprising a sensor that is attached to the device, wherein the sensor is configured to detect a change of motion within a target area, and, in response, send a notification signal to the processor, wherein the module is further configured to cause the processor to send the command based on receiving the notification signal.

7. A system of user detection, comprising:
   a camera configured to rotate to a plurality of positions;
   a memory that stores a module; and
   a processor coupled, locally or remotely, to the camera, configured to run the module stored in the memory that is configured to cause the processor to:
   send a command to the camera to cause the camera to (1) rotate to a position from the plurality of positions, and (2) capture a photo or a video clip at the position,
   receive the photo or the video clip from the camera,
   divide the photo or the video clip into a plurality of zones,
   determine whether a user is captured in a zone from the plurality of zones,
   send another command to the camera to cause the camera to retake one or more photos or video clips if the user is not captured in the zone from the plurality of zones, and
   determine whether the user is associated with a device based on information of the position and the zone.

8. The system of claim 7, wherein the module is further configured to cause the processor to recognize a face of the user.

9. The system of claim 7, wherein the module is further configured to cause the processor to recognize a landmark in the photo or the video clip, and wherein determining whether the user is associated with the device is further based on the landmark.

10. The system of claim 7, wherein the module is further configured to cause the processor to send the command periodically.

11. The system of claim 7, further comprising a sensor that is attached to the device, wherein the sensor is configured to detect a likelihood of having the user enter or leave a target area, and, in response, send a notification signal to the processor, wherein the module is further configured to cause the processor to send the command based on receiving the notification signal.

12. The system of claim 7, further comprising a sensor that is attached to the device, wherein the sensor is configured to detect a change of motion within a target area, and, in response, send a notification signal to the processor, wherein the module is further configured to cause the processor to send the command based on receiving the notification signal.

13. A method for user detection, comprising:
   sending, at a server to a camera, a command to cause the camera to (1) rotate to a position from a plurality of positions, and (2) capture a photo or a video clip at the position;

receiving, at the server from the camera, the photo or the video clip;

determining, at the server, whether a user is captured in the photo or the video clip;

dividing, at the server, the photo or the video clip into a plurality of zones;

determining, at the server, a zone from the plurality of zones where the user appears in the photo or the video clip;

send another command to the camera to cause the camera to retake one or more photos or video clips if the user does not appear in the photo or the video clip; and determining, at the server, whether the user is associated with a device based on information of the position and the zone.

14. The method of claim 13, further comprising recognizing a face of the user.

15. The method of claim 13, further comprising recognizing a landmark in the photo or the video clip, and determining whether the user is associated with the device is further based on the landmark.

16. The method of claim 13, wherein the command is sent periodically.

17. The method of claim 13, further comprising receiving, from a sensor, a notification signal that indicates a likelihood of having the user enter or leave a target area, and wherein the command is sent based on receiving the notification signal.

18. The method of claim 13, further comprising receiving, from a sensor, a notification signal that indicates a change of motion within a target area, and wherein the command is sent based on receiving the notification signal.

19. A method for user detection, comprising:

sending, at a server to a camera, a command to cause the camera to (1) rotate to a position from a plurality of positions, and (2) capture a photo or a video clip at the position;

receiving, at the server from the camera, the photo or the video clip;

dividing, at the server, the photo or the video clip into a plurality of zones;

determining, at the server, whether a user is captured in a zone from the plurality of zones;

send another command to the camera to cause the camera to retake one or more photos or video clips if the user is not captured in the zone from the plurality of zones; and determining, at the server, whether the user is associated with a device based on information of the position and the zone.

20. The method of claim 19, further comprising recognizing a face of the user.

* * * * *